United States Patent
Nisslbeck et al.

(10) Patent No.: US 9,577,416 B2
(45) Date of Patent: Feb. 21, 2017

(54) ELECTRICAL FEED-THROUGH AND THE USE THEREOF

(71) Applicant: SCHOTT AG, Mainz (DE)

(72) Inventors: Josef Nisslbeck, Bruckberg (DE); Thomas Fink, Landshut (DE); Thomas Goettlinger, Landshut (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/826,897

(22) Filed: Aug. 14, 2015

(65) Prior Publication Data

US 2016/0049781 A1 Feb. 18, 2016

(30) Foreign Application Priority Data

Aug. 14, 2014 (DE) .................. 10 2014 216 226

(51) Int. Cl.
| | | |
|---|---|---|
| *H02G 3/22* | (2006.01) | |
| *H01B 17/30* | (2006.01) | |
| *H01B 1/02* | (2006.01) | |

(52) U.S. Cl.
CPC .............. *H02G 3/22* (2013.01); *H01B 1/02* (2013.01); *H01B 17/30* (2013.01)

(58) Field of Classification Search
CPC ............ H02G 3/22; H01B 1/02; H01B 17/30
USPC ........................................................ 174/650
See application file for complete search history.

(56) References Cited

U.S. PATENT DOCUMENTS

| | | | |
|---|---|---|---|
| 3,825,669 A | 7/1974 | Korner et al. | |
| 5,493,073 A | 2/1996 | Honkomp | |
| 7,927,139 B2 | 4/2011 | Bernauer et al. | |
| 2009/0223699 A1 | 9/2009 | Bernauer | |
| 2011/0061896 A1 | 3/2011 | Bernauer et al. | |
| 2013/0330605 A1 | 12/2013 | Kroll et al. | |
| 2013/0337316 A1* | 12/2013 | Kroll ................. | C03C 3/19 |
| | | | 429/181 |
| 2014/0099533 A1* | 4/2014 | Hartl ................. | C03C 8/24 |
| | | | 429/175 |
| 2014/0231133 A1 | 8/2014 | Fritz et al. | |
| 2016/0036016 A1* | 2/2016 | Dahlmann .......... | B23K 1/0016 |
| | | | 429/179 |

FOREIGN PATENT DOCUMENTS

| | | | | |
|---|---|---|---|---|
| DE | 1640495 A1 | 12/1971 | | |
| DE | 69508145 T2 | 10/1999 | | |
| DE | 102007061174 A1 | 6/2009 | | |
| DE | 102008045816 A1 | 3/2010 | | |
| DE | 102011106873 A1 * | 1/2013 | ............ | B23K 20/10 |
| DE | 102013202614 A1 | 8/2014 | | |

(Continued)

*Primary Examiner* — Timothy Thompson
*Assistant Examiner* — Charles Pizzuto
(74) *Attorney, Agent, or Firm* — Ohlandt, Greeley, Ruggiero & Perle, LLP

(57) ABSTRACT

A feed-through for conducting electric current is provided that includes a flange, which has a through-opening, in which a conductor for electric current is held by an insulation component and is connected to the flange so that the through-opening is sealed off. The insulation component is flush with the upper side and/or the underside of the flange or is set back (T) from the upper side and/or the underside of the flange in the through-opening. The conductor includes a cobalt-iron alloy of which the cobalt content is 68 to 84% by weight.

20 Claims, 8 Drawing Sheets

(56) References Cited

FOREIGN PATENT DOCUMENTS

| | | |
|---|---|---|
| EP | 2031288 B1 | 7/2010 |
| GB | 1140637 A | 1/1969 |
| JP | 2009146901 | 7/2009 |
| JP | 2010220463 | 9/2010 |
| JP | 2014510995 | 5/2014 |

\* cited by examiner

ELECTRICAL FEED-THROUGH AND THE USE THEREOF

CROSS REFERENCE TO RELATED APPLICATIONS

This application claims benefit under 35 U.S.C. §119(a) of German Patent Application No. 10 2014 216 226.2 filed Aug. 14, 2014, the entire contents of which are incorporated herein by reference.

BACKGROUND OF THE INVENTION

1. Field of the Invention

The invention relates to electrical feed-throughs, suitable in particular for high currents, and to use thereof. With such a feed-through, electric currents can be introduced into and removed from safety-related enclosures and in this way electrical loads can be supplied with electric current. Also comprised in particular are feed-throughs in the low voltage range and medium voltage range. They are generically referred to generally as large feed-throughs, since their components can have diameters ranging from a few centimeters to many centimeters and the total weight may be several kilograms.

2. Background

In the case of enclosures for storing or transporting flammable hazardous material, enclosures of energy generating or storing devices or enclosures in which hazardous substances occur and/or are stored, known collectively as safety enclosures, it is often necessary to introduce and/or remove electric currents into and/or from the enclosure. For example, submersible pumps, in particular also cryogenic pumps, are used in installations for conducting and/or transporting liquefied natural gas, arranged within the enclosure. In order to introduce the power required for the pumps into the interior of the enclosure, connection devices with sealing electrical feed-throughs are used. In the case of energy generating units, for example steam generators of power plants, the energy generated must be safely removed and/or apparatuses in these energy generating units have to be supplied with current. For this purpose, a feed-through is typically flange-mounted on a flange of the safety enclosure, for example a pressure vessel, in particular a liquefied gas tank.

In particular in the case of pressure vessels of flammable gases and/or liquids, it is important here that the feed-through remains sealed over a long time. Especially when storing flammable substances, which can form explosive gas mixtures, there is still the risk here that, even in the event of extremely small leakages that are not in themselves critical, gas mixtures may be formed in closed-off regions of the feed-through. For example, such regions may be formed in mounted protective housings. If a deflagration then occurs, the feed-through may be damaged in such a way that unsafe material quickly escapes from the enclosure that is to be closed off. This is also relevant in particular in the case of installations for generating nuclear energy, in particular in order to ensure secure containment of the reactor housing and/or sealing of the reactor housing itself even in the event of a fault.

EP 2 031 288 B1 describes an electrical feed-through for liquefied gas tanks in which an electrical conductor is soldered in a flange by means of an insulating bushing. The flange has a through-opening, in which the electrically insulating bushing is connected to the flange with the help of the connecting elements with the numbers 20 and 22 as used in the drawings. The insulating bushing is tubular and has inside an electrical conductor of a smaller diameter than the inside diameter of the bushing. At its ends, the gap between the bushing and the conductor is hermetically sealed, so that there is a relatively great clearance between the bushing and the conductor. In the bushing there is a bore. The flange is of a two-part design, so that between the flanges there is a clearance, which connects the clearance in the bushing to the clearance between the flanges through the bore in the bushing, or a one-part flange is provided with a bore that corresponds to the bore of the bushing. By monitoring the pressure in the clearance of the bushing, gas penetrating into the bushing can be detected, and consequently damage to the feed-through can be monitored.

This feed-through has the problem that the electrically insulating bushing is of a certain length and protrudes beyond the surface of the flange. It is tubular and has a clearance that extends around the inner conductor. The material of the bushing is a ceramic, which is known as being a brittle material. In the case of such a feed-through unit, specifically the bushing may rupture under mechanical loading, especially since it protrudes beyond the surface of the flange. In the event of rupture, the barrier between the safety enclosure and the surroundings would be breached. Apart from that, the material of the bushing and of the inner conductor must be made to match one another with respect to their thermal expansion. Furthermore, the production of such a bushing involves considerable manufacturing expenditure.

DE 10 2013 202 614 A, not yet published at the time of the first application of the present invention, describes a feed-through in a flange in the case of which the functional element, for example a conductor for electric current, is glazed-in in a flange, the insulation components of glass not protruding beyond the surface of the flange. In order to provide electrical conductors for high current intensities with the aid of this feed-through, it is provided in this document that an electrical conductor is held by a first functional component, which in turn is glazed-in in the through-opening. The electrical conductor consists in particular of copper. Since this cannot be glazed in directly, the copper conductor is connected to the first functional component without a gap. The first functional component consists of a material that can be glazed in. Usually, the electrical conductor is in this case formed by a copper rod which is surrounded by a steel tube that establishes the connection with the glass material of the insulation component. In this case, the sealing of the connection of the copper rod to the steel tube must be ensured. Such a solution is mechanically stable, but requires increased production expenditure, in particular on account of the required connection of the copper rod and the steel tube.

SUMMARY

Against this background, the object of the invention is to provide an electrical feed-through that is suitable for high current intensities, is able to withstand high mechanical loads and can be produced with reduced expenditure.

The feed-through according to the invention comprises a flange, which has an upper side and an underside, and a through-opening with an inner wall and also a conductor for electric current, which is arranged within the through-opening by means of at least one electrically insulating insulation component and in this way is connected to the flange by means of the insulation component. As a result, the through-opening is sealed off. The through-opening extends from the upper side to the underside of the flange. Since the terms upper side and underside are relative terms, the through-opening similarly extends from the underside to the upper side of the flange. Generally, the side facing the interior of the safety enclosure is referred to as the upper side; the underside is that side of the surface of the flange that is opposite from the upper side.

The at least one insulation component is provided in the through-opening in such a way that it is flush with the upper side and/or the underside of the flange. This means that it does not protrude beyond the upper side and/or the underside of the flange. Alternatively, the at least one insulation component is provided such that it is set back from the upper side and/or the underside of the flange in the through-opening. This means that the at least one insulation component is then provided as it were recessed within the through-opening. As a result, the insulation component is protected from mechanical damage that may occur for example in the event of a fault, or else during installation and/or servicing.

According to the invention, the conductor for electric current consists at least in its core region of a cobalt-iron alloy, the cobalt content of which is from 68% by weight to 84% by weight. The iron content is accordingly in particular from 16% by weight to 32% by weight. It is similarly possible that small fractions of other substances, in particular metals, are contained in the alloy, the proportion of which can be at most approximately 2% by weight. Particularly advantageous cobalt contents are, in each case in % by weight, 70%, 71%, 72%, 73%, 74%, 75%, 76%, 77%, 78%, 79%, 80%, 81% and/or 82%. The corresponding iron contents are logically obtained mathematically.

The inventors have recognized that the stated alloy with the stated contents of its components on the one hand has good electrical properties, in particular with respect to conductivity, but on the other hand can also be connected well to glass as the material of the insulation component, in particular because the chemical properties are compatible and the coefficients of thermal expansion $\alpha_{20\text{-}300}$ of the stated cobalt-iron alloy are suitable for the glass materials stated further below. Thus, the stated cobalt-iron alloy may have coefficients of thermal expansion $\alpha_{20\text{-}300}$ in the temperature range around 100° C. of approximately 9.0 ppm/K to approximately 12 ppm/K; values of approximately 9.5 ppm/K to approximately 11.5 ppm/K are particularly advantageous.

The term coefficient of thermal expansion is generally known. As used in the present description, this term represents more precisely the coefficient of linear thermal expansion, commonly represented by the symbol $\alpha$. As used in the present description, the term coefficient of thermal expansion even more precisely is meant to shortly name the coefficient $\alpha_{20\text{-}300}$, which is commonly used to represent the average linear coefficient of thermal expansion in the temperature range from 20° C. to 300° C., shortly symbolized by $\alpha_{20\text{-}300}$.

Another advantageous property of the aforementioned alloys is their small specific electric resistance. Advantageous values are less than 0.1 $\mu\Omega\cdot m$ at 20° C., especially less than 0.085 $\mu\Omega\cdot m$ at 20° C. and/or less than 0.080 $\mu\Omega\cdot m$ at 20° C. and/or less than 0.075 $\mu\Omega\cdot m$ at 20° C. Such small values of the specific electric resistance in particular enables the inventive feedthrough to connect devices with high electric currents without heating the conductor to a larger amount. As effect, the inventive feed-through is suitable for low temperature applications because the cooled media are not heated by the conductor when the device is under operation. Furthermore, the balance between the coefficient of thermal expansion of the flange, the conductor and the insulation-component is not disturbed.

In particular if it consists of glass and/or glass ceramics and/or ceramics, the material of the insulation component may be chosen such that it has a coefficient of thermal expansion in the temperature interval of the planned operating conditions that is less than that of the flange and/or of the stated cobalt-iron alloy. The glazing-in then obtained is known as compressive glazing-in, in which the metal components exert a compressive stress on the insulation component, which additionally fixes the latter in the through-opening. However, in particular if it consists of glass, it is similarly also possible to select the material of the insulation component in such a way that it has substantially the same coefficient of thermal expansion in the temperature interval of the planned operating conditions as the flange and/or the stated cobalt-iron alloy. Then a feed-through known as an adapted feed-through is obtained. These terms are known to a person skilled in the art and can be used for the subject matter of the invention.

A preferred embodiment of the invention can be summarized to comprise a flange made of a material which has coefficient of thermal expansion $\alpha_{20\text{-}300}$ which is larger than the coefficient of thermal expansion $\alpha_{20\text{-}300}$ of the material of the at least one insulation component and that the flange exerts a compressive stress on the at least one insulation component, at least at a temperature of 20° C.

The coefficient of thermal expansion $\alpha_{20\text{-}300}$ of the insulation component's material is advantageously chosen to be similar to the coefficient of thermal expansion $\alpha_{20\text{-}300}$ of the conductor's material. In numerical ranges, the coefficient of thermal expansion $\alpha_{20\text{-}300}$ of the conductor is at least 30% larger or smaller than the coefficient of thermal expansion of the insulation component, advantageously at least 20%, more advantageously at least 15%, especially advantageously at least 10%, specifically advantageously at least 7%.

The balance of the coefficients of thermal expansion of the materials of the flange, the insulation component and/or insulation components and of the conductor is of particular importance, because otherwise at the operational temperature, especially changing operational temperatures, a permanently hermetical or at least tight feed-through element could not be achieved.

The core region of the conductor is the region in which the electric current is primarily conducted. The conductor is usually a solid rod of the stated cobalt-iron alloy. However, the invention also comprises solutions in which the conductor is coated, for example in order to increase the adhesive bonding with respect to the insulation component and/or optimize and/or adapt the electrical transfer resistances. Then the core region of the conductor consists of the stated cobalt-iron alloy and the shell region consists of a different material.

The geometry of the conductor can be adapted to the required current intensities. As mentioned at the beginning, the feed-throughs of this description concern a large feed-through. The conductor may have a diameter of over 5 mm, in particular over 7 mm and/or else over 10 mm.

Use of the stated cobalt-iron alloy as a conductor in the feed-through according to the invention makes it possible to connect the conductor to the insulation component directly, or optionally with just a coating provided, in particular when insulation components of glass and/or glass ceramics are used, and thus to dispense with the laborious welding of a copper conductor to a steel or iron tube. Given a suitable choice of the diameter of the conductor, it is nevertheless possible with such a solution to pass currents of high intensity over the conductor. In particular, current intensities of over 50 A are made possible in corresponding embodiments.

The flange may usually be a metal component, for example a disc, in particular of steel. The through-opening may be produced by drilling, but also by milling, turning, primary forming and all other suitable methods. The through-opening may usually run perpendicularly through the main area of the flange, which is referred to here as the surface, so that the height of its wall area substantially corresponds to the height of the flange. The flange itself should in turn be fastened to other components, for example to safety enclosures. If the flange consists of a metal, the feed-through of the generic type is also referred to as a metal fixing-material feed-through.

The flange, and consequently the conductor connected by the insulation component and/or components, form a structural unit as a feed-through. The flange itself may be fastened to other components, for example safety enclosures, by customary means, preferably reversibly, for example by screwing. During the installation and/or exchange of the feed-through according to the invention, the entire flange with the components located therein is usually installed and/or removed.

As described, the flange usually likewise comprises a metal. Standard steel with electroplating, for example Cu, Ni and/or a combination of the two, is advantageous, as are Ni alloys, and/or Cr steels. Similarly advantageous are high-grade steels, in particular austenitic high-grade steels such as AISI 304/304L and 316/316L, which are distinguished particularly in the case of marine applications by their resistance to salt water. Similarly advantageous are thermally highly resistant steels, such as for example Invar, Inconel and Monel. Also suitable and thereby comprised by the invention are tough at sub-zero temperature steels. Such tough at sub-zero temperature steels are according to DIN 17280 steels having a minimum value of the notch impact energy of at least 27 Joule measured at ISO-V probes in cross and tangential direction at a temperature of −60° C. or lower.

The expression that the flange comprises the metal, especially one of the described advantageous metals, is especially meant to comprise embodiments in which the flange is composed of different materials. Because for the purpose of the invention the secure and tight sealing of the feed-through opening is important, such embodiments especially comprise flange constructions in which the inner wall of the feed-through opening at least in sections comprises said metals.

Similarly preferred are austenitic steels, which are suitable because of their high notch impact resistance at very low temperatures, in particular cryogenic temperatures.

In a preferred embodiment, the feed-through comprises at least two insulation components that are separate from one another and spaced apart from one another, in which the conductor is held in the through-opening such that it is electrically insulated from the flange, the insulation components forming a space between themselves and the inner wall of the through-opening and the conductor. The space may be a clearance and/or be fully or partially filled with further media, for example a porous material, and/or fluids.

The electrically insulating insulation components may consist of suitable materials, for example plastics and/or glass materials and/or glass-ceramic and/or ceramic materials. Especially with glass materials and/or glass-ceramic materials, hermetic sealing of the first functional component, and consequently of the feed-through as a whole, can be permanently achieved.

The longitudinal axis of the conductor usually extends parallel to the longitudinal axis of the through-opening; advantageously, the arrangement of the first functional component in the through-opening is even coaxial. The at least two electrical insulation components of this embodiment enclose the conductor in particular in an annular manner and hold it in the through-opening. The electrical insulation components are advantageously glass, glass-ceramic and/or ceramic components. This technology is known to a person skilled in the art as glass-metal feed-through. The conductor is glazed in as it were in the through-opening by means of the insulation components. These materials have the advantage that they have high insulation values and are chemically insensitive to the attack of aggressive substances. However, they have the disadvantage that they are brittle materials that may be sensitive to mechanical loads. The use of plastics, in particular high-performance plastics such as for example PEEK, is similarly possible however.

In this embodiment, the at least two electrical insulation components that are separate from one another are in particular incorporated in the through-opening in such a way that they form a space between themselves and the inner wall of the through-opening and the first electrical conductor. In the case of a circular through-opening, the clearance therefore has the form of a ring. All other diameter geometries are of course similarly possible and covered by the invention, and similarly all resultant geometries of the clearance. In particular, the insulation component and/or components do not protrude beyond the surface of the flange. Particularly advantageously, they finish with the surface of the flange or are even recessed within the through-opening. In this way, they are protected from mechanical effects, for example parts flying around in the event of a fault and/or tools carelessly used during repairs.

In a particularly preferred embodiment of the feed-through according to the invention, this space can be connected by means of at least one monitoring opening to a measuring instrument and the monitoring opening runs through one of the electrical insulation components and/or the flange. The monitoring opening advantageously runs through the flange, the one end of the monitoring opening being provided in particular in the inner wall of the through-opening in the region of the clearance, or it runs through at least one of the insulation components or through a combination of both. Consequently, media entering the clearance due to failure of the insulation components can be detected by the measuring instruments that can be connected to the monitoring opening. The measuring instrument may for example be a pressure gauge. This allows a change in pressure in the clearance to be indicated and is an indicator for example for setting off an alarm. It is similarly possible for the measuring instrument to be designed as a gas sensor, which detects the ingress of another gas into the clearance. The space itself may be filled with negative pressure, a vacuum, any desired protective gases, nonconducting liquids, etc. All of this and the connectability to all possible measuring instruments are covered by the invention. In this way, all critical components of the feed-through can be monitored in the feed-through according to the invention.

It is similarly possible that the feed-through has more than one monitoring opening for a through-opening. It is then possible in particular for a fluid to be conducted through the one monitoring opening into the clearance and out again through the at least one other monitoring opening. The one monitoring opening then forms as it were the flow and the other monitoring opening forms as it were the return for the fluid. In the operating state, the fluid may in particular be in a liquid or gaseous state. It may in particular be a fluid for cooling, such as for example water or liquid $N_2$, which prevents or at least delays the thermal damage, in particular the melting of functional components and/or insulation components, in particular in the event of a fault. Similarly, the medium may be a protective medium, for example a chemically largely inert liquid or a protective gas, such as for example gaseous $N_2$ and/or gaseous He, Ar and/or other protective or noble gases. Particularly advantageously, the formation of an oxygen-containing ignitable atmosphere can be prevented by flushing with gaseous $N_2$ and/or other protective gases. It is similarly possible to use fluids that change their state of aggregation in the event of a fault, and can thus also serve for cooling and/or as a protective gas with low fluid conversion. The flow and/or return for the fluid may be located in the flange and/or in the insulating material. If the flow and/or return are located in the flange, this can be achieved by corresponding bores in the flange. If the flow and/or return are located in the insulation component, it is possible for example for tubes to be embedded in the latter for this purpose.

Especially advantageously the at least one insulation component is directly connected to the through-opening, or at maximum there is an intermediate layer with a small thickness such as an adhesion promoter or an adaption layer between the inner wall of the through-opening and the insulation component, which might for example comprise another glass or glass-ceramic material. Thereby a direct joint between the inner wall of the through-opening and the material of the insulation component is provided. In case the intermediate layer is applied, there is a two-dimensional plane between the material of the intermediate layer and the inner wall of the through-opening. Thereby chemical and/or physical interaction of the material of the insulation component, including the optional intermediate layer, and the material of the flange could provide additional force to secure the insulation component within the feedthrough-opening.

The conductor advantageously has at least one deformation region, in which the material thickness of the conductor is locally reduced, so that the mechanical stability of the conductor is lowered in the deformation region and the conductor can be deformed under mechanical loading in the deformation region, in particular in the operating state and/or in the event of a fault. The deformation region may in particular be formed by a recess in the conductor. A recess is understood as meaning for example a notch, a groove, a blind hole, etc.

The deformation region makes it possible for torques, pressure, tension, bending moments, shearing moments and/or vibrations to be applied to the conductor. The deformation directed into the deformation region has the effect of preventing overloading of the feed-through in the corresponding operating states, in particular dynamic overloading when peak loads are acting on it, and the mechanical load-bearing capacity of the feed-through is in this way increased. The deformation region cushions as it were mechanical peak loading acting on it, so that it is possible to the greatest extent to prevent the conductor from being torn out from the flange and/or to prevent the material of the flange from being torn. The deformation region also serves as a predetermined breaking point, so that in the event of damage to the conductor the damaged location occurs mainly in the deformation region, without the barrier of the feed-through as a whole being breached as a result. This makes the feed-through according to the invention particularly resistant to faults.

In a further preferred embodiment of the feed-through according to the invention, the conductor comprises at least two separate portions, which are connected by interengaging connecting structures that are connected to one another in an extendable and/or retractable and/or rotatable manner. For this purpose, the mutually facing ends of the portions of the conductor may have interengaging structures, for example such as plugs and sockets.

The deformation region and/or the connecting structures may be present at any desired points of the conductor. For example, they may be provided away from the main plane of the flange along the longitudinal axis of the conductor, i.e. in the region of the conductor that protrudes beyond the upper side and/or the underside of the flange, inside or outside the safety enclosure, for example in order to supply electric motors there with electric current. These and/or the cables connected to them by way of the conductor could in turn exert a torque and/or bending moment on the conductor. The deformation region makes twisting and/or elastic vibration of the conductor about its longitudinal axis (i.e. torsion) possible, so that the corresponding mechanical moment is kept away from the fastening of the conductor in the through-opening, in particular the insulation component, or is at least reduced in such a way that it is no longer harmful there. In this example of an application, this measure prevents the conductor from being twisted out and/or broken out from the fixing material, in particular the insulation component. Elastic bending vibration of the conductor is similarly possible, the bend lying in the deformation region. This also relieves the insulation components in particular, and improves the mechanical load-bearing capacity of the feed-through according to the invention. The same applies to the connecting structures of the conductor.

It is particularly preferred that the deformation region or the connecting structures of the conductor are arranged in the space between at least two separate insulation components. This embodiment has the advantage that the conductor has the maximum stability at its ends. If, however, the feed-through is exposed to excessive mechanical loads, in particular compressive loads, which act perpendicularly to the longitudinal axis of the conductor, a rupture of the insulation components may occur. But even then, the mechanical loading is at least reduced by the deformation region and/or the connecting structures, and only one of the insulation components ruptures, generally the one that is closest to the source of the mechanical loading. However, because the insulation components are separate from one another, the destruction of one insulation component does not mean that the barrier is lost. The other, intact insulation component then still provides secure sealing of the enclosure. In this way, peak pulses of compressive loading in particular can be reliably cushioned, which has particular advantages in the case of fault-relevant applications. The rupture of the one insulation component can be detected by suitable measures, for example acoustic and/or optical monitoring devices, whereupon an exchange of the feed-through can be instigated.

In a similarly preferred embodiment, the conductor protrudes beyond the upper side and/or the underside of the flange, i.e. beyond one of the main areas of the particularly disc-shaped flange. In this embodiment, the deformation region is arranged in the protruding region of the conductor, i.e. in particular outside the space between the two insulation components. In the case of this embodiment, the mechanical loading is kept away from the insulation component and/or components, so that the probability of these being damaged in the operating state and/or in the event of a fault is reduced. It is similarly possible that such a deformation region is used at the same time as a connection structure for an electrical load, for example as protection against the electrical connection, in particular a connecting sleeve, slipping off. It is similarly possible and covered by the invention that there are in the protruding region of the conductor structures that only serve as an electrical connection structure, in particular as a safeguard for connected conductors, such as for example cables. These electrical connection structures may be present as an alternative to or in combination with the deformation region and/or, as described, may act at the same time as a deformation region.

It is similarly provided that the flange has a flange element that forms at least a partial region of the inner wall of the through-opening and in particular at least one of the electrical insulation components is arranged in this partial region of the through-opening that is formed by the flange element.

The flange element may consist of a different material than the main body of the flange, in particular of a different metal, or else consist of the same material. The flange element advantageously forms at least a partial region of the inner wall of the through-opening. At least one of the electrical insulation components is then advantageously arranged in this partial region.

This means that in the flange there may be a step-shaped recess, created for example by drilling and/or milling and/or turning, in the portion of which with the greatest diameter a ring element is fitted and is connected to the main body of the flange. The connection may be created for example by welding. The inner diameter of the flange element advantageously corresponds to the diameter of the through-opening, so that there is a cylindrical through-opening. At least one of the insulation components is then advantageously provided in the region of the through-opening that is formed by the flange element. As described above, the material of the insulation component located there is adapted to the material of the surrounding through-opening, so that in this embodiment the material of the first insulation component and the material of the second insulation component may differ from one another, in particular if the material of the flange and the material of the flange element are different from one another. In particular, the insulation components may consist of different glasses and/or glass ceramics.

Independently of the flange being configured with or without a further flange element, it is particularly advantageous and covered by the invention that in the through-opening and/or on the first functional component there are means for avoiding a relative movement between the flange and/or the first functional component.

The means for avoiding the relative movement may be obtained by suitable profiles of the through-opening and/or by the configuration of the outer wall of the conductor. In particular, the through-opening may have a profile that is only slightly tapered and/or has a step. The taper and/or step may serve as retaining means, which make it mechanically more difficult for the insulation components to be pushed out when positive pressure is applied on the side of the through-opening that has the greater diameter. Apart from steps, conical and/or part-conical profiles of the through-opening for example are possible in particular. The inner wall of the through-opening is in this case provided as it were with the means for avoiding the relative movement.

In a further advantageous embodiment, at least one of the insulation components has a coating. This may in particular strengthen the insulation component with respect to flexural loads, as are produced in particular when pressure is applied. Since, as described, the insulation component may consist in particular of brittle materials, the coating may also prevent rupturing of the insulation component if it suppresses the initial formation of a crack, in particular on its side facing away from the application of the pressure. Coatings of the insulation component with plastics for example are advantageous.

The invention similarly covers use of the feed-through according to the invention in safety enclosures, in particular pressure vessels and/or liquefied gas tanks, and/or reactor chambers and/or reactor housings and/or pump housings and/or generator housings, and consequently also these enclosures, tanks, chambers and/or housings themselves.

A particularly preferred use of the feed-through according to the invention is that of supplying electric motors and/or pumps, in particular cryogenic pumps, with electric current. For this purpose, they are usually connected to the conductor of the feed-through according to the invention.

A particularly efficient method of production for a preferred embodiment of an electrical feed-through according to the invention comprises the following steps: providing a flange, which usually consists of a metal, and which has at least one through-opening, providing at least two insulation-component preforms; these are usually compacts of a glass, a ceramic and/or a glass ceramic; the compacts are usually annular, providing a conductor that is, at least in its core region, of a cobalt-iron alloy of which the cobalt content is from 68% by weight to 84% by weight, in particular a conductor of a cobalt-iron alloy of which the cobalt content is from 68% by weight to 84% by weight, introducing the first insulation component preform into the through-opening, introducing the conductor into the annular space of the first insulation component, introducing the second insulation-component preform into the through-opening, so that it is held in the through-opening, heating up all of the arranged components to a temperature that brings about the fusing of the insulation-component preforms with the inner wall of the through-opening and the first functional component, and optionally the fusing of the solder material between the first functional component and the second functional component; the fusing results in the creation of the separate insulation components and an electrically insulating connection, which is in particular hermetically sealed, between the inner wall of the through-opening and the conductor, cooling down the electrical feed-through.

It is similarly possible that the insulation component of glass, i.e. the compact as a preliminary stage, changes during the processing process, during the heating up, in particular that components can evaporate and/or that the glass at least partially crystallizes.

It is similarly possible not to arrange the insulation components in the through-opening at the same time and heat them up together, but first to arrange and heat up an insulation-component preform (and the conductor) in the through-opening. Particularly advantageously, the material of the insulation-component preform is chosen such that it at least partially crystallizes during the heating up and that the at least partially crystallized material has a higher softening temperature than the uncrystallized material. This can be achieved with corresponding glasses that are known to a person skilled in the art. The second insulation-component preform may be subsequently arranged in the through-opening, whereupon in turn it is heated up to a temperature at which the second insulation-component preform fuses with the inner wall of the through-opening. If the material of the second insulation-component preform is chosen such that its processing temperature lies below the softening temperature of the at least partially crystallized first insulation component, the first insulation component still fixes the conductor securely in the through-opening during the heating up. A suitable material is, for example, a glass.

In this way, a precision production process can be realized. Furthermore, the chemical properties of the insulation component, in particular its chemical resistance, can be adapted to the requirements of the installation situation of the flange by choosing different glass and/or glass-ceramic materials. For example, the insulation component facing the process side may be chemically resistant to the process media, while the insulation component on the side facing away from the process side may in particular be resistant to the atmospheric surroundings, for example in particular be water-resistant.

The techniques of glass fusion, compact production, etc. are known to a person skilled in the art in the area of glass-metal seals. It is also possible and covered by the invention that a flange has a number of through-openings in which the feed-throughs described are located. It is similarly possible and covered by the invention if more than one conductor is fixed in the insulation component or components within a through-opening.

The electrical feed-through according to the invention can be used in many applications. Particularly preferred is the application in safety enclosures, in particular pressure vessels and/or reactor chambers and/or liquefied gas tanks, but also in housings of any electrical control devices and/or sensor and/or actuator or generator or pump housings. With the feed-through according to the invention, electric motors and/or electrical control devices and/or sensors and/or actuators and/or pumps and/or submersible pumps and/or cryogenic pumps can be advantageously supplied with electric current. The temperature application range may in this case extend in particular from the low-temperature range, as is relevant for example for cooling fluids and/or liquefied gases, to high temperatures, as may occur in particular under the conditions of a fault and/or emergency.

BRIEF DESCRIPTION OF THE DRAWINGS

The invention is further explained on the basis of the figures. All of the figures are purely schematic; the size and/or proportions of the actually existing electrical feed-throughs according to the invention and/or their individual components may deviate from the drawings. The figures likewise represent exemplary embodiments that have been produced by the methods described.

DETAILED DESCRIPTION

Figure 1:
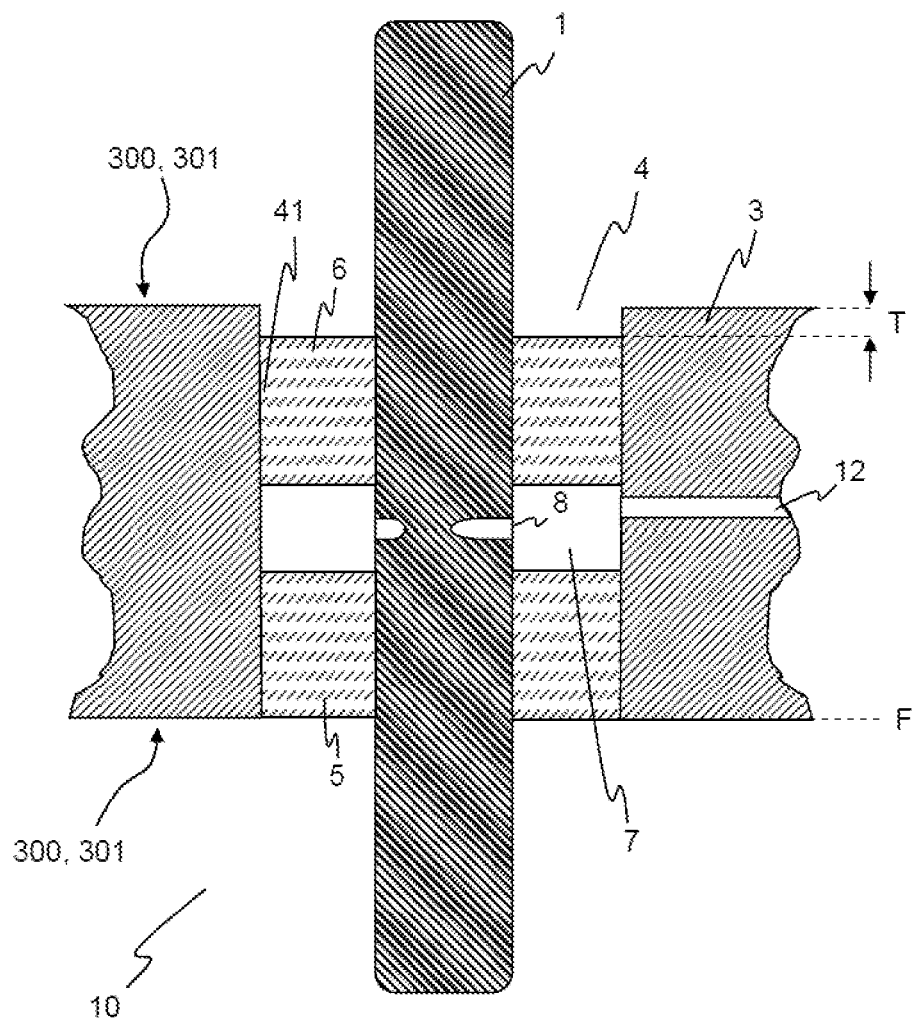
FIG. 1 shows the section through a feed-through according to the invention with a conductor, which has a deformation region, formed by slit-shaped recesses in a space between two insulation components that is connected to a monitoring opening.

FIG. 1 represents the section through a feed-through (10) according to the invention perpendicularly to the upper side and/or underside (300, 301) of the flange (3). In the flange there is the through-opening (4), which has an inner wall (41). Arranged in the through-opening is a conductor for electric current (1), which takes the form of a rod and is of the stated cobalt-iron alloy. This conductor must be held in the through-opening (4) of the metallic flange (3) in an electrically insulated manner. This is achieved by the separate insulation components (5, 6) which, as described above, are produced in particular from glass and/or glass-ceramic materials in order to achieve hermetic sealing of the through-opening (4). If lower requirements are imposed on the hermeticity and/or ageing resistance and/or durability, however, insulation components (5, 6) of plastics are also possible. The two separate electrical insulation components (5, 6) form in the through-opening the space (7), which in particular is annular and in which the deformation region (8) of the conductor (1) is arranged.

As already described, the side that is facing the process side, for example the interior of the safety enclosure, is usually understood as being the upper side (300) and is part of the flange. The underside (301) is the opposite side. The terms should accordingly be understood in relation to one another and are interchangeable. No functionalizing of the respective side is associated with the terms.

As represented in FIG. 1, the one insulation component (5) is provided in the through-opening (4) in such a way that it is flush (F) with the upper side or the underside (300, 301) of the flange (3). This means in particular that the surface of the insulation component (5) does not protrude beyond the upper side or the underside (300, 301) of the flange (3). The insulation component (6) is provided in the through-opening (4) in such a way that it is set back (T) from the upper side or the underside (300, 301) of the flange (3). It is consequently as it were recessed within the through-opening (4). In this way, the insulation components (5, 6) are protected from the risk of being destroyed or damaged by mechanical effects.

In this exemplary embodiment, the deformation region (8) of the conductor (1) is formed by slit-shaped recesses. Opening out into the space (7), the monitoring opening (12) is provided in the flange (3). As described, measuring instruments can be connected to it. A rupture of the barrier of the insulating material (5, 6) can be detected by means of measuring instruments that can be connected to the monitoring opening (12). A rupture of one of the insulation components (5, 6) can be detected by these instruments, for example as a result of pressure fluctuations of the medium located in the space (7). It is similarly possible for measuring instruments connected to the monitoring opening (12) to be used for detecting medium that is optionally provided in the clearance (7) and escapes in the event of damage.

Figure 2:
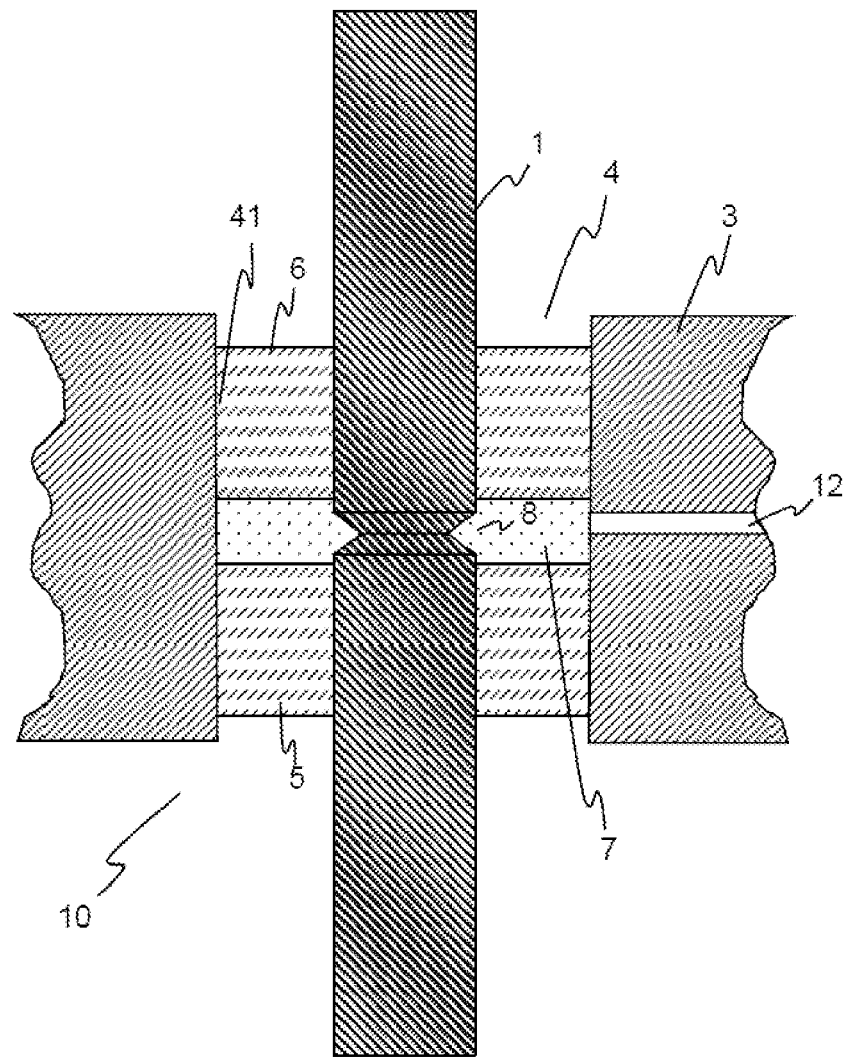
FIG. 2 shows the section through a feed-through according to the invention that is shown in FIG. 1, the deformation region being formed by a peripheral notch of the conductor.

FIG. 2 shows the section through a feed-through (10) according to the invention, which is similar to that represented in FIG. 1. The conductor (1), the deformation region (8) of which is formed by a peripheral notch, is in turn arranged within the space (7). Here, too, the conductor (1) is held in the through-opening (4) by the two electrical insulation components (5, 6) that are separate from one another. The insulation components (5, 6) hermetically seal the through-opening (4) and are provided in the through-opening (4) in a recessed manner (T). For this purpose, they preferably consist of glass and/or glass ceramic. An important criterion for the permanent hermeticity of the glass-metal composite is that the coefficient of thermal expansion $\alpha_{20-300}$ of the materials connected to one another are made to match one another. Thus, in the present case, the coefficient of thermal expansion $\alpha_{20-300}$ of the glass of the insulation components (5, 6) has been made to match the material of the flange (3) and that of the conductor (1). The flange (3) usually consists of a steel, so that the glass of the insulation components (5, 6) has been made to match the steel of the flange (3) and the stated material of the conductor (1).

The glass of the insulation components (5, 6) may be chosen such that its thermal expansion corresponds approximately to that of the flange (3) and of the conductor (1). This corresponds to what is known as the adapted feed-through. Particularly good hermeticities and mechanical load-bearing capacities of the feed-through can be achieved by using what is known as a compressive seal or compressive feed-through, in which the material of the insulation components (5, 6), for example glass and/or glass ceramic, has a lower coefficient of thermal expansion $\alpha_{20-300}$ than the flange (3). During the cooling down of the connection of the insulation components (5, 6), the flange (3) and the conductor (1) that has been established by the joining process, the flange shrinks as it were onto the insulation components (5, 6) and exerts a compressive stress on them. This compressive stress clamps as it were the insulation components in the through-opening, so that the holding forces produced by the compressive stress are added to the forces produced by chemical bonding and other surface effects. This is possible in the case of all the exemplary embodiments and/or figures.

Advantageously, both the described adapted feed-through and the compressive feed-through are similarly material-bonded connections between the material of the inner wall (41) of the through-opening (4) and the insulation components (5, 6). With the material-bonded connection, a chemical bond in particular is formed in the interfacial region of the connected components. In particular in the case of low-temperature applications, the flange shrinks onto the insulation component of glass and/or glass-ceramic material and thus exerts a compressive stress on it.

The two insulation components (5, 6) are separate from one another and, according to the drawing, are for example annular. They form the annular space (7) between themselves, the inner wall (41) of the through-opening (4) and the surface of the first functional component (1). This space may be at least partially filled by a medium and/or further material, for example a porous material that can be permeated with medium.

Figure 3:
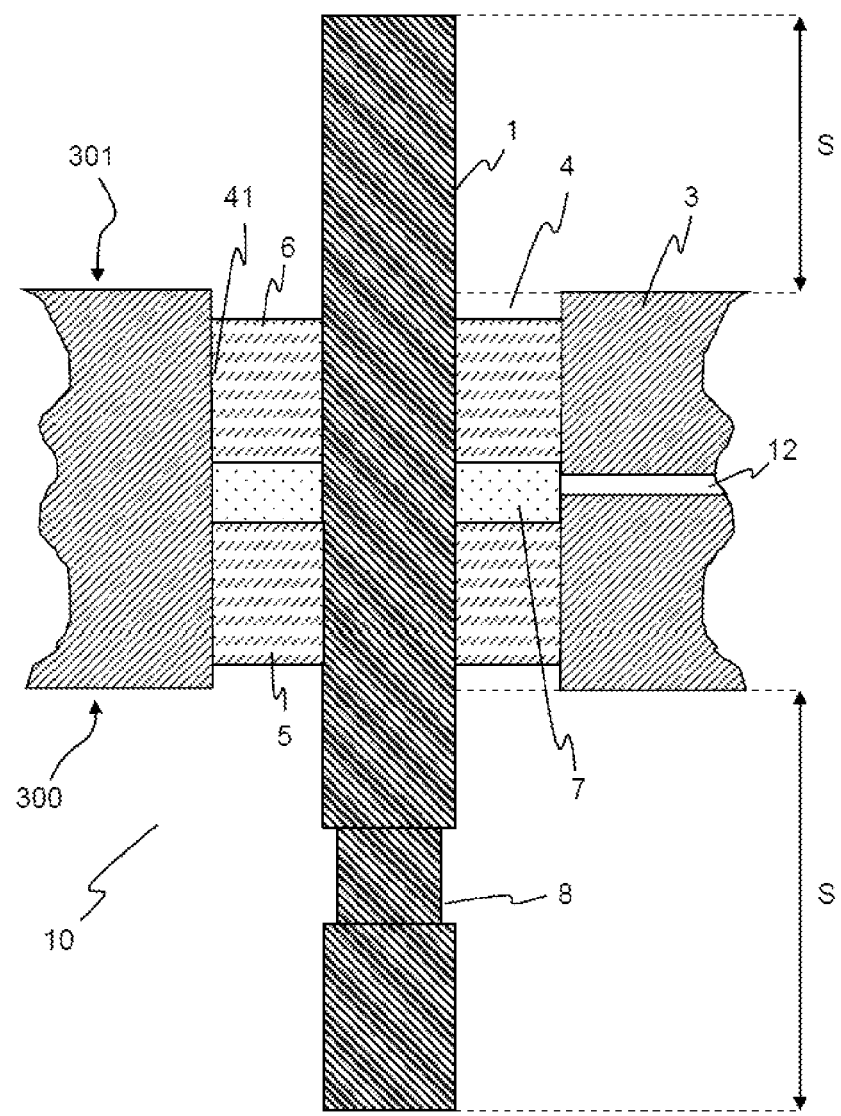
FIG. 3 shows the section through a feed-through according to the invention in which the deformation region and/or the electrical connection structure is in the region of the conductor that protrudes beyond the surface of the flange.

FIG. 3 shows the section through an electrical feed-through (10) according to the invention perpendicularly to the upper side and/or the underside (300, 301) of the flange (3). It corresponds to the greatest extent to the embodiment of FIGS. 1 and 2, the only difference being that the deformation region (8) of the conductor (1) is in a region of the conductor (1) that protrudes (S) beyond the upper side and/or the underside (300, 301) of the flange (3). Here, the deformation region (8) has the form of a peripheral groove. If the conductor (1) is exposed to mechanical loading, in particular under the effect of a torque, torsion can occur in the deformation region (8), keeping loading away from the insulation components (5, 6). This allows the probability of the insulation components (5, 6) rupturing to be reduced. Similarly, the deformation region (8) can perform a dual function if it is used as a connecting structure for the connection of electrical loads, i.e. serves as a connection structure. The groove may then serve in particular as protection against the connection being unintentionally pulled off. It is similarly possible that the connection structure only performs the function of safeguarding and/or improving the electrical conductor, and does not act as a deformation region.

Figure 4:
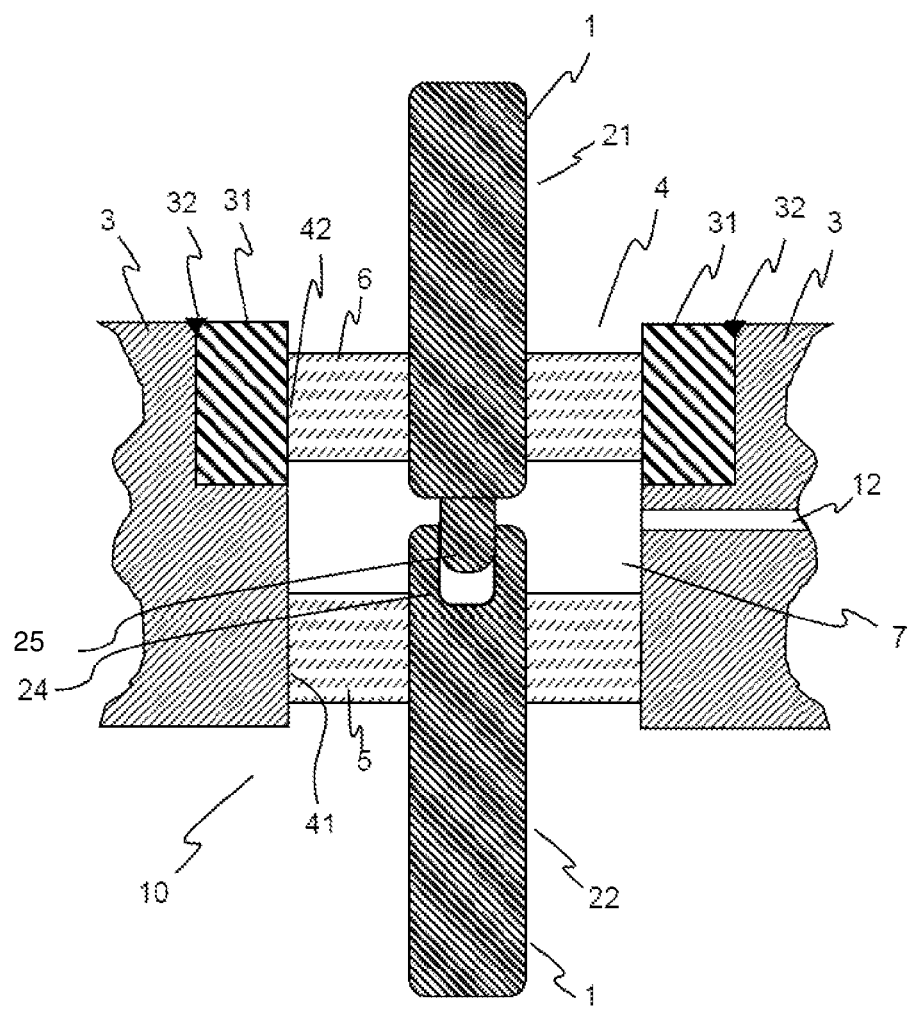
FIG. 4 shows the section through a feed-through according to the invention with a conductor which has two portions that are connected to one another by interengaging structures.

In FIG. 4, the section perpendicularly to the surface of the flange (3) through a feed-through (10) according to the invention is represented, with a conductor (1), which has two portions (21, 22) that are connected to one another by interengaging structures (24, 25). As represented in the figure, the interengaging structures (24, 25) may be formed as plugs and sockets. The two portions (21, 22) of the conductor (1) are displaceable and/or rotatable with respect to one another along the longitudinal axis.

Also shown in the exemplary embodiment of FIG. 4 is a special possible configuration of the flange (3) in which a ring has been welded in here as a flange element (31) of the same metal as the flange material or a different metal. On the flange there is correspondingly the weld seam (32), which connects the flange (3) and the flange element (31) to one another. The inner wall of the through-opening (4) accordingly has portions (41, 42) of different materials, in particular different metals, with in particular different thermal expansion. This embodiment has the advantage that, if a different material is used for the flange element (31) than for the flange (3), the welded-in material (31) can have different properties than the material of the main flange (3), for example with regard to the thermal expansion. This makes it possible that the insulation component (6) adjoining thereto can consist of a different material than the other insulation component (5), in particular a different glass. In this way, the feed-through (10) can be adapted particularly well to the requirements of the application, for example if the materials used are to meet special requirements with respect to chemical resistance and/or material hardness and/or temperature resistance, etc. This applies similarly to all of the embodiments. The other features of the embodiment shown in FIG. 4 correspond substantially to the previous figures.

Figure 5:
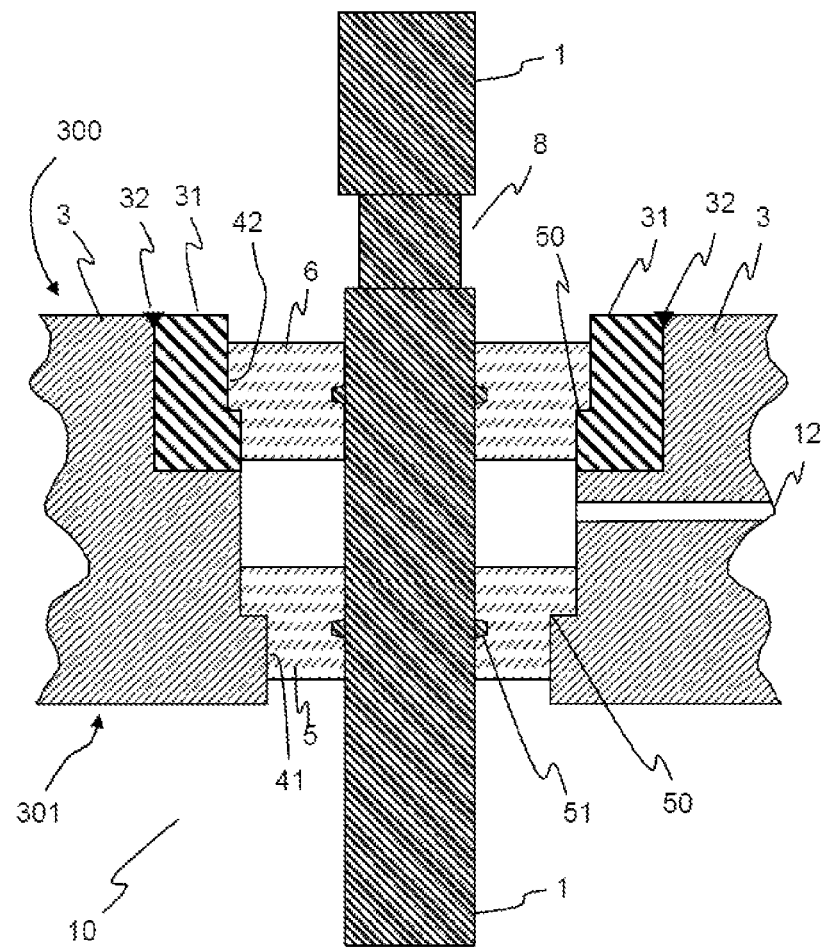
FIG. 5 shows the section through a feed-through according to the invention in which the flange comprises a welded-in flange element and the through-opening and the conductor have means for avoiding a relative movement.

FIG. 5 shows the section perpendicularly to the surface of the flange (3) through a feed-through (10) according to the invention in an embodiment that corresponds substantially to a combination of FIGS. 3 and 4. The flange (3) has a flange element (31), which is welded-in in the flange (3) by the weld seam (32). As a development of the invention, in this figure and exemplary embodiment there are means for avoiding the relative movement (50, 51) between the flange (3) and the insulating material (5, 6) and also between the conductor (1) and the insulating material (5, 6).

There are a great many possibilities for the specific configuration of the means for avoiding a relative movement between the components, in particular for avoiding sliding out, especially under compressive loading. In order to avoid detachment of the conductor (1) from the insulation components (5, 6) under loading of the feed-through (10) as a whole, means for avoiding a relative movement (50) are provided on the inner circumference of the through-opening (4). These means are distinguished by local changing of the diameter of the through-opening (4); in the drawing of FIG. 5 by the steps (50) arranged in the through-opening (4). In particular in the case of compressive loading from the direction of the larger diameter of the through-opening (4), the fixing material, here the insulation components (5, 6), and consequently also the conductor (1), are held better by the means for avoiding the relative movement (50) in the through-opening. If the means for avoiding the relative movement (50) are provided in the through-opening, this has the advantage that they ensure secure holding of the fixing material (5, 6) even when there is bending of the flange (3) in the direction of the aforementioned compressive loading, in particular flexure. It has been found that bending of the flange (3) can even increase the holding force of the fixing material (5, 6), since under the bending the fixing material is clamped in on the side facing the pressure in the through-opening (4). This additional clamping force is stronger than the effects that are produced by possible formation of a gap on the side facing away from the pressure, in particular if the means for avoiding the relative movement (50) are in the through-opening (4).

Similarly represented in FIG. 5 are means for avoiding the relative movement (51) that are provided on the conductor (1). These too are, in general terms, local changes of the outside diameter of the conductor (1), here the projections (51). The means for avoiding the relative movement (50, 51) between the flange (3) and the conductor (1) also do not have to be designed in the way represented in FIG. 5 to prevent pushing out of the conductor (1), but may also be configured in such a way that twisting of the conductor (1) and/or the insulation components (5, 6) in the through-opening (4) is prevented. Suitable for this purpose are, in particular, structures running along the inner wall (41, 42) of the through-opening (4) to the greatest extent perpendicularly to the surface of the flange (3), such as for example scores or ridges in the through-opening.

It goes without saying that any suitable structures in the through-opening (4) and/or on the first functional component (1) are possible as means for avoiding the relative movement (50, 51) and are covered by the invention.

In the embodiment, the deformation region (8) of the conductor (1) is provided on the side of the conductor (1) that is facing a pressure vessel, in the region where it protrudes beyond the upper side (300) of the flange (3). According to this figure, the means for avoiding the relative movement (50) in the flange (3) and/or flange element (31) are formed in such a way that they can withstand the effect of pressure acting from the side of the deformation region (8). In particular, the steps of the means for avoiding the relative movement (50) are formed in such a way that the diameter of the through-opening is greater in the direction of the application of pressure, i.e. the upper side (300), than in the direction of the side facing away from the pressure, i.e. the underside (301).

Figure 6:
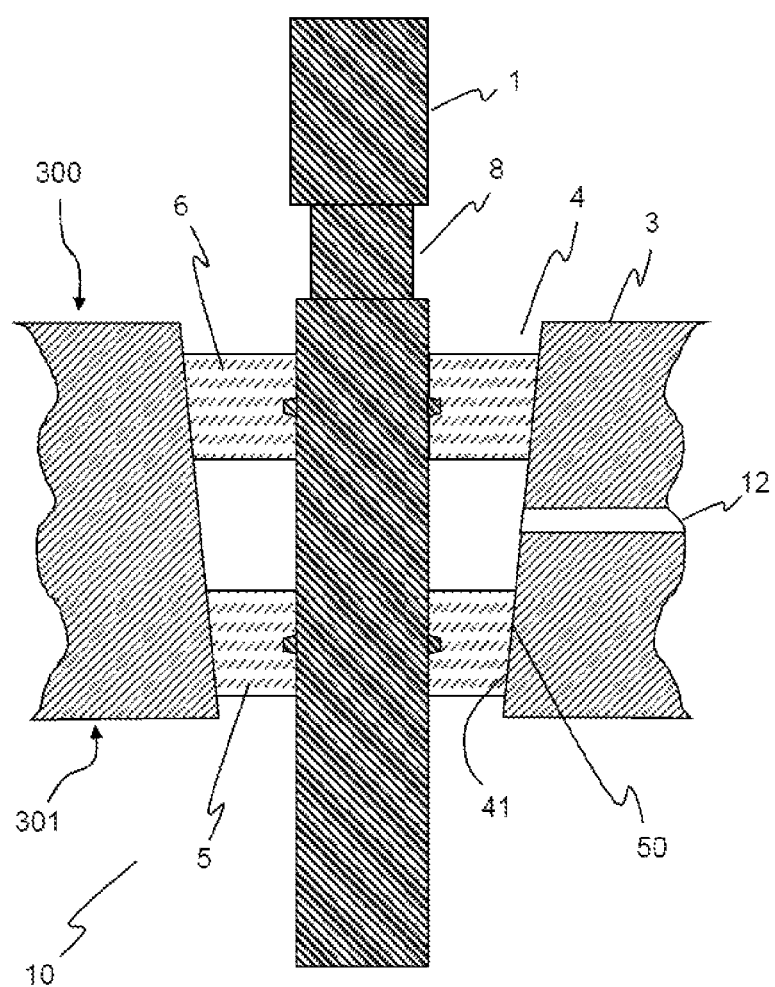
FIG. 6 shows the section through a feed-through according to the invention such as that in FIG. 5, the through-opening having alternative means for avoiding a relative movement.

FIG. 6 substantially shows an embodiment according to FIG. 5, in which the means for avoiding the relative movement (50) in the through-opening (4) is achieved by a conical profile of the through-opening. The compressive loading takes place in turn from the direction of the maximum diameter of the through-opening, and the flange (3) is usually mounted in a correspondingly oriented manner on the safety enclosure. Correspondingly, the upper side (300) here is that side on which the conical profile of the through-opening (4) has the greater diameter. The underside (301) of the flange (3) is the side opposite from the upper side (300).

Figure 7:
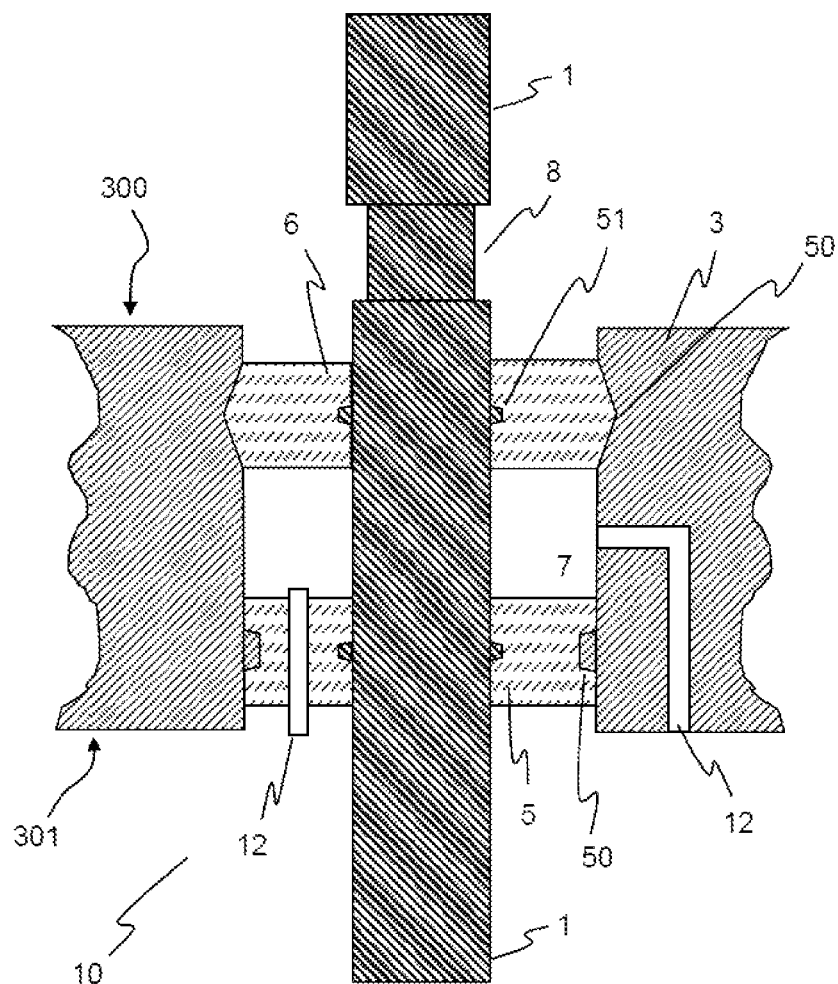
FIG. 7 shows the section through a feed-through according to the invention such as that in FIGS. 5 and/or 6, the through-opening having alternative means for avoiding a relative movement.

FIG. 7 substantially shows in turn an embodiment corresponding to FIG. 5, with alternative means provided in the through-opening (4) for avoiding a relative movement (50) between the flange (3) and the conductor (1). Thus, a widening (50) of the diameter is provided in a region of the through-opening (4) in which the one insulation component (6) is provided, while there is a local reduction in the diameter of the through-opening (4) in the region in which the other insulation component (5) is provided.

Whether there is/are no, one, two or more monitoring opening(s) (12) in the feed-through (10) according to the invention is dependent on the respective application. Each of the embodiments represented in the figures may also be provided with no, one or more monitoring opening(s) (12). Similarly represented in FIG. 7 is a monitoring opening (12), which in this example runs in an L-shaped manner through the flange (3) and may be created for example by corresponding bores. There is similarly a second monitoring opening (12), which runs through an insulation component (5). Alternatively, it could also run through the flange (3). The space (7) is accordingly accessible through the two monitoring openings (12). The monitoring openings (12) may serve in particular as the flow and return of a cooling fluid that can be conducted into the clearance (7) and, as already described, can increase the thermal resistance of the feed-through (10), in particular in the event of a fault. Likewise, as described, protective fluid, for example protective gas, in particular gaseous nitrogen ($N_2$), can prevent the formation of an explosive mixture in the clearance (7). In the event of rupturing of an insulation component, it is similarly possible to introduce the cooling fluid and/or protective fluid into the spaces that are otherwise closed by the flange. Particularly advantageous may be fluids that have a phase transition for example in the case of expansion or temperature ranges occurring in the event of a fault, in particular because particularly efficient cooling can take place as a result, but also if the gas produced can at the same time serve as a protective gas. A loss of the fluid and/or a drop in pressure and/or an increase in pressure and/or a change in the composition of the fluid can be detected by connected measuring instruments, and consequently damage to the feed-through (10) and/or the presence of a fault can also be automatically detected.

Figure 8:
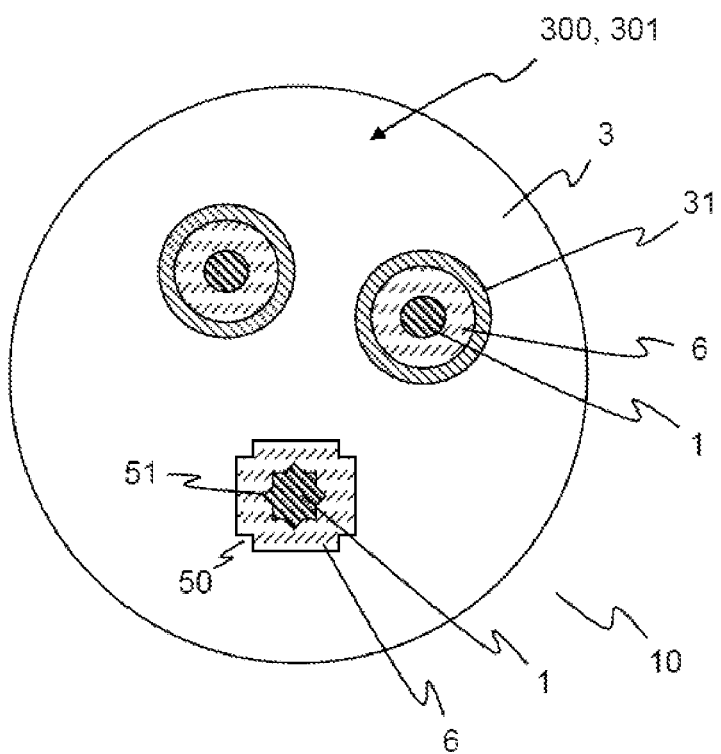
FIG. 8 shows the plan view of a feed-through according to the invention in which there is more than one through-opening in the flange.

FIG. 8 shows the plan view of a feed-through (10) according to the invention, directed towards the upper side or the underside (300, 301) of the flange (3). There is more than one through-opening (4) in the flange (3) and an electrical feed-through with a conductor (1) of the stated cobalt-iron alloy is inserted in each of the through-openings (4). In the example represented, the optional annular flange element (31) is similarly present in the flange (3) and forms a portion of the through-opening (4). The through-openings (4) may include means for avoiding a relative movement (50, 51) between the flange (3) and the first functional component (1). In the case of a through-opening, this is symbolized by its unround diameter geometry. The means for avoiding a relative movement (50) are provided there along the inner wall of the through-opening in the direction of the one opening to the other opening, represented here by the plan view of the webs (50). The conductor (1) may have similar webs (51). This through-opening is, in particular, twist-proof, i.e. in particular torque can be applied to the conductor (1).

Figure 9:
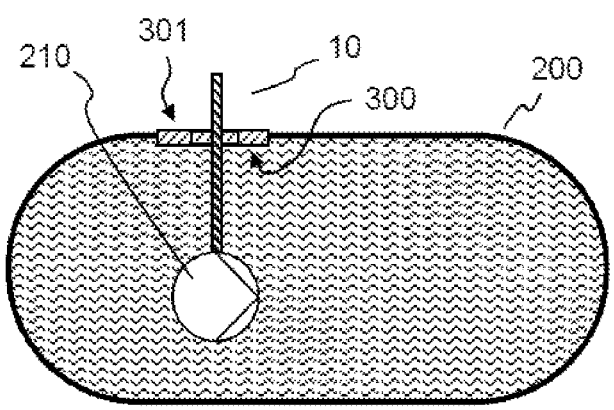
FIG. 9 shows the use of a feed-through according to the invention in a liquefied gas tank with a connected pump.

FIG. 9 schematically shows the provision of a feed-through (10) according to the invention on a safety enclosure, here a liquefied gas tank (200). Connected to the feed-through (10) inside the liquefied gas tank (200) is a submersible pump (210), which in this way is supplied with electric current, in particular by means of the conductor (1). The tank may in particular contain liquefied gas. The feed-through according to the invention is especially suitable for correspondingly low temperatures. This application area benefits from the described low value of the specific electrical resistance of the conductor material at 20° C., which further decreases at lower operational temperatures.

The feed-through (10) according to the invention has the advantage that, as a result of the presence of only one flange, it can be produced with little effort and that it is able to withstand higher mechanical loads. Even in the case of overloading, the barrier formed by it is not breached. Even minor damage can be detected during operation, so that in particular corresponding servicing measures can be automatically initiated and/or a fault alarm can be automatically set off. Consequently, the feed-through (10) according to the invention is resistant to faults and makes a contribution to improving the operational reliability of safety enclosures for example. The choice of the material of the conductor (1) means that it can be produced particularly efficiently, since this material can be connected well to the insulation components (5, 6), so that it is possible to dispense with further auxiliary components, and nevertheless currents of high intensity can be passed over the conductor (1) to a load by the virtue of the low specific electric resistance.

What is claimed is:

1. A feed-through for conducting through electric currents, comprising:
    a flange with an upper side, an under side, and a through-opening with an inner wall, the through-opening extending from the upper side to the underside of the flange; and
    a conductor for electric current arranged within the through-opening by at least one electrically insulating insulation component, the at least one electrically insulating insulation component being connected to the flange so that the through-opening is sealed off,
    wherein the at least one insulation component is flush with the upper side and/or the underside and/or is set back from the upper side and/or the underside in the through-opening, and
    wherein the conductor consists, at least in a core region, of a cobalt-iron alloy having a cobalt content of 68 to 84% by weight.

2. The feed-through according to claim 1, wherein the flange comprises a coefficient of thermal expansion that is larger than or similar to a coefficient of thermal expansion of the at least one insulation component, and wherein the conductor comprises a coefficient of thermal expansion that differs at maximum 30% from the coefficient of thermal expansion of the at least one insulation component.

3. The feed-through according to claim 1, wherein the flange has a coefficient of thermal expansion that is larger than a coefficient of thermal expansion of the at least one insulation component, and
    wherein the flange, the at least one insulation component, and the conductor are configured so that the flange exerts a compressive stress on the at least one insulation component at least at a temperature of 20° C.

4. The feed-through according to claim 1, wherein the flange comprises a metal selected from at least one of the group consisting of standard steel with electroplating, Ni alloy, Cr steel, high-grade steel, austenitic high-grade steel, thermally highly resistant steel, tough at sub-zero temperature steel, and any combinations thereof.

5. The feed-through according to claim 1, wherein the cobalt-iron alloy of the conductor has a specific electric resistance of less than 0.1 μΩ·m at 20° C.

6. The feed-through according to claim 1, wherein the at least one insulation component hermetically seals the through-opening comprises a material selected from the group consisting of glass, glass ceramic, ceramic, and combinations thereof.

7. The feed-through according to claim 1, wherein the conductor is connected to the flange in a manner electrically insulated from the flange.

8. The feed-through according to claim 1, wherein the at least one insulation component comprises at least two insulation components that are separated from one another in the through-opening to form a space therebetween and between the inner wall and the conductor.

9. The feed-through according to claim 8, wherein the space is connected by least one monitoring opening to a measuring instrument or to a fluid source.

10. The feed-through according to claim 8, further comprising at least one monitoring opening in communication with the space.

11. The feed-through according to claim 10, wherein the at least one monitoring opening runs through one of the at least two insulation components and/or through the flange.

12. The feed-through according to claim 8, wherein the conductor comprises a deformation region having a region of reduced material thickness sufficient so that the conductor is deformed at the deformation region under mechanical loading.

13. The feed-through according to claim 12, wherein the deformation region is within the space.

14. The feed-through according to claim 13, wherein the space is connected by least one monitoring opening to a measuring instrument or to a fluid source.

15. The feed-through according to claim 1, wherein the conductor comprises a deformation region having a region of reduced material thickness sufficient so that the conductor is deformed at the deformation region under mechanical loading.

16. The feed-through according to claim 1, wherein the conductor comprises at least two portions connected by interengaging connecting structures, the interengaging connecting structures being connected to one another in an extendable and/or retractable and/or rotatable manner.

17. The feed-through according to claim 16, wherein the conductor has a region that protrudes beyond the upper side and/or the underside of the flange.

18. The feed-through according to claim 17, wherein the deformation region and/or the connecting structures is/are arranged in the region that protrudes.

19. The feed-through according to claim 1, wherein the flange forms a portion of a device selected from the group consisting of a safety enclosure, a pressure vessel, a liquefied gas tank, a pump housing, a generator housing, a reactor chamber, a housing of an electrical control device, a housing of at least one sensor, and a housing of at least one actuator.

20. The feed-through according to claim 1, wherein the conductor is electrically connected to a device selected from the group consisting of an electric motor, an electrical control device, a sensor, an actuator, a pump, a submersible pump, and a cryogenic pump.

* * * * *